United States Patent
Crosslen et al.

(10) Patent No.: US 6,497,393 B1
(45) Date of Patent: Dec. 24, 2002

(54) ADJUSTABLE DISPLAY DEVICE FOR SECURING CELLULAR PHONES TO A DISPLAY

(75) Inventors: John Crosslen, Saukville, WI (US); Michael Colombo, Cedarburg, WI (US); Alan McGivern, Grafton, WI (US)

(73) Assignee: Frank Mayer & Associates, Inc., Grafton, WI (US)

( * ) Notice: Subject to any disclaimer, the term of this patent is extended or adjusted under 35 U.S.C. 154(b) by 0 days.

(21) Appl. No.: 09/827,832

(22) Filed: Apr. 6, 2001

Related U.S. Application Data
(60) Provisional application No. 60/232,518, filed on Sep. 14, 2000.

(51) Int. Cl.[7] ............................................... F16M 11/00
(52) U.S. Cl. .................. 248/176.1; 248/74.3; 248/553; 24/16 PB
(58) Field of Search ...................... 248/74.3, 70, 176.1, 248/553; 24/16 PB, 309

(56) References Cited

U.S. PATENT DOCUMENTS

| | | | | |
|---|---|---|---|---|
| 2,491,290 A | * | 12/1949 | Tinnerman .................. 24/16 R |
| 2,632,217 A | * | 3/1953 | Flora ......................... 24/16 PB |
| 3,149,808 A | * | 9/1964 | Weckesser ................. 248/74.3 |
| 3,694,863 A | * | 10/1972 | Wasserlein, Jr. .......... 24/16 PB |
| 4,128,220 A | * | 12/1978 | McNeel ....................... 248/60 |
| 4,272,047 A | * | 6/1981 | Botka ........................ 248/74.3 |
| 4,300,371 A | * | 11/1981 | Herwick et al. ............... 70/58 |
| 4,441,233 A | * | 4/1984 | Swift ....................... 24/16 PB |
| 4,558,495 A | * | 12/1985 | Olsen ......................... 24/298 |
| 4,705,245 A | * | 11/1987 | Osada ....................... 248/74.3 |
| 4,708,306 A | * | 11/1987 | Mitomi ..................... 248/74.3 |
| 5,524,463 A | * | 6/1996 | Schenkel et al. ............ 70/57.1 |
| 5,904,442 A | * | 5/1999 | Takeda ....................... 403/392 |
| 6,024,522 A | * | 2/2000 | Bainbridge et al. ......... 411/410 |
| 6,098,253 A | * | 8/2000 | Nishida et al. ............... 24/429 |
| 6,105,908 A | * | 8/2000 | Kraus ....................... 248/74.3 |
| 6,311,531 B1 | * | 11/2001 | Sykes ......................... 70/57.1 |

* cited by examiner

*Primary Examiner*—Anita King
*Assistant Examiner*—Naschica S. Morrison
(74) *Attorney, Agent, or Firm*—Boyle Fredrickson Newholm Stein & Gratz S.C.

(57) ABSTRACT

A universal cell phone security band for displaying cell phones of various sizes includes a band that is placed around the phone. The band has a first end and a second end with notches extending from its edges. The band's second end is received in an adjustable slide at a slot including a wide portion configured to receive the notched second end and a narrow portion configured to receive the portions of the band between the notches. The adjustable slide also has an opening that is configured to receive a threaded connector that is disposed on the band's first end. The opening and the threaded connector are secured with a security-type fastener having a recess that requires the use of a tool other than a traditional flathead or Phillips head screwdriver to rotate the security fastener. A cable can secure the universal security band to a display.

14 Claims, 2 Drawing Sheets

US 6,497,393 B1

ADJUSTABLE DISPLAY DEVICE FOR SECURING CELLULAR PHONES TO A DISPLAY

CROSS-REFERENCE TO RELATED APPLICATIONS

This application claims priority under 35 U.S.C. §119(e) to U.S. Provisional Patent Application No. 60/232,518, filed Sep. 14, 2000, the entirety of which is incorporated by reference herein.

FIELD OF THE INVENTION

This invention relates to a universal cell phone security band. In particular, it relates to a band for securing handheld wireless telephones of various sizes for display in retail stores.

BACKGROUND OF THE RELATED ART

Recently there has been an explosion in the use of wireless telephones, commonly called cellular telephones, or just cell phones. To fill the need of consumers, there has been a corresponding increase in the number of manufacturers and styles of cellular telephones. Improvements in technology have enabled manufacturers to produce cellular telephones that are very small in size. Producers and retailers of cellular telephones obviously need to display their products for sale to consumers. However, because the products are highly desirable and very small, they are prone to theft. Of course, various techniques have been employed to secure cellular telephones to display areas. Due to the many varying sizes, up to this point each method of securing cellular telephones to a display area has been uniquely designed for the particular phone being displayed. The method of securing the phone to the display must also be capable of allowing a potential purchaser to hold the phone in his or her hand to simulate its use, and it also must be secure enough so that the product cannot be easily stolen.

Thus, an improved means for securely displaying cellular telephones, and one that is adaptable for use on a variety of styles of phones is desired.

SUMMARY OF THE INVENTION

The cell phone security band that includes a band adapted to wrap around cell phones of various sizes is provided. More particularly, the universal cell phone security band disclosed herein includes an elongated band having a first end and a second end with notches extending from the edges of the second end of the band. The second end of the band is received in a slot that forms an adjustable slide. The slot includes a wide portion configured to receive the notches on the second end of the band, and a narrow portion configured to receive the portions on the second end of the band between the notches.

The adjustable slide also has an opening that is configured to receive a threaded connector that is disposed on the first end of the band. The security fastener is secured to the opening of the adjustable slide with a security fastener having a recess. The recess requires the use of a tool other than a traditional flathead or Phillips head screwdriver in order to rotate the security fastener. Such a tool has an end that is complementary to the recess in the fastener. For example, the fastener is a bolt with a star-shaped recess, and the tool has an end that is complementary to the recess.

A cable can be secured on one end to the universal security band and on the other end to a display to secure the cell phone to the display. Preferably, the cable is secured to the threaded fastener of the universal security band.

A method of using the universal security band is also provided. It includes the following steps. A band is wrapped around the item. The second end of the band is inserted through a wide portion of a slot of an adjustable slide. The second end of the band is pulled through the adjustable slide until a hole on the adjustable slide is aligned with the threaded connector on the first end of the band. A cable is secured to one of the band, the threaded connector, and the adjustable slide. A security fastener is inserted through the hole in the adjustable slide and though the threaded connector. The security fastener is rotated into the threaded connector to secure the item to the display.

Accordingly, a universal cell phone security band for securely displaying wireless telephones of various sizes and configurations is provided. Other objects and advantages of the invention will become apparent from the following description that sets forth, by way of illustration and example, certain preferred embodiments of the present invention.

BRIEF DESCRIPTION OF THE DRAWINGS

The drawings, which constitute a part of the disclosure and illustrate an exemplary embodiment of the present invention, include the following.

DETAILED DESCRIPTION OF THE INVENTION

Figure 1A:
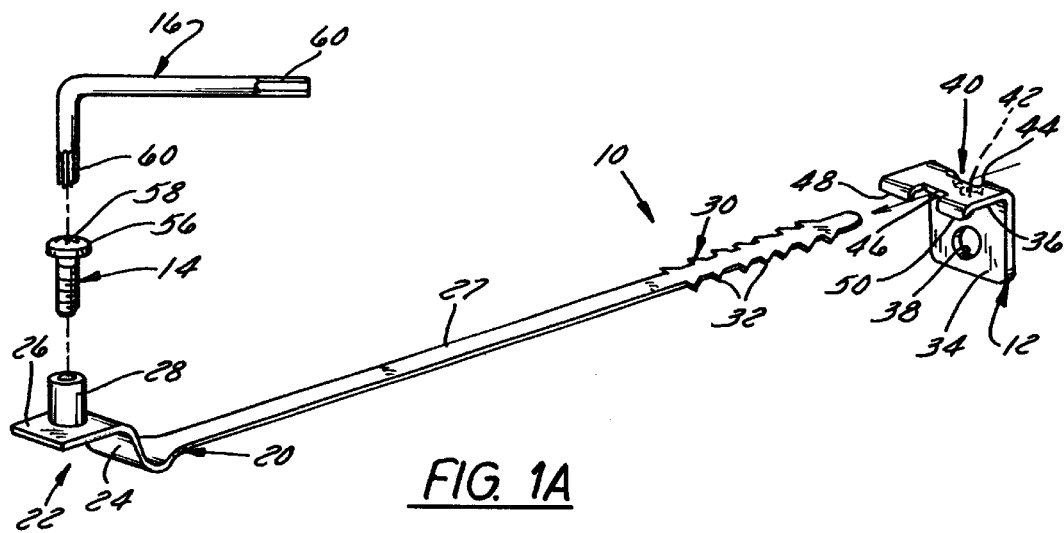
FIG. 1A is a perspective view of the components of the universal cell phone security band disclosed herein, and illustrates in particular the band, adjustable slide, security bolt, and security wrench.
Figure 1B:
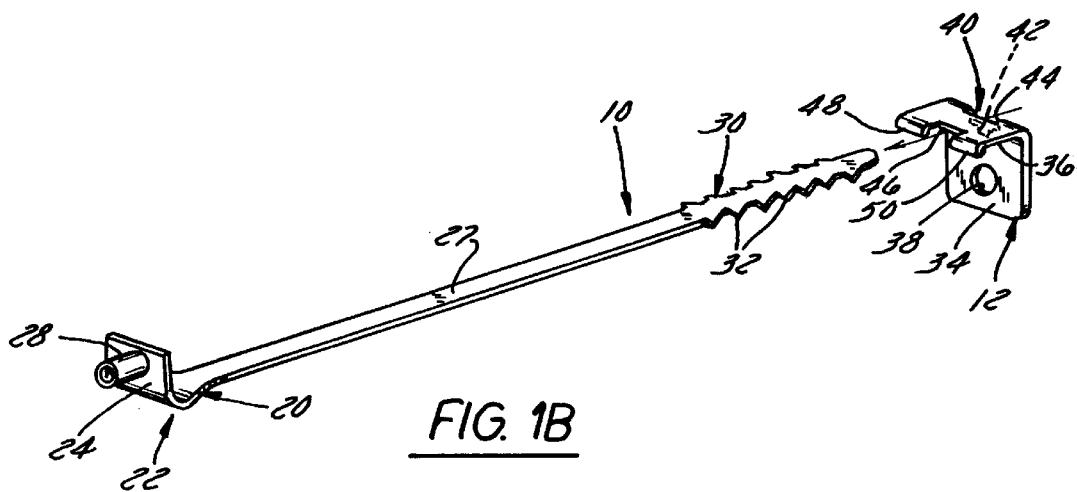
FIG. 1B is a perspective view of the components of a second embodiment of the universal cell phone security band disclosed herein.

In the drawings, two preferred embodiments of the universal cell phone security system in accordance with the invention are illustrated in FIGS. 1A and 1B. The universal cell phone security system includes an elongated band 10, an adjustable slide 12, a security style fastener 14, a complementary tool 16, and a cable 18 for attaching the band 10 to a display (shown in FIG. 2).

The band 10 is essentially a long thin metallic strip. A first preferred embodiment of the band 10 is shown in FIG. 1A. The first end 20 of the band 10 includes a widened portion 22 that is initially bent at a right angle to the band 10 to form a vertical portion 24 and then is bent at a second right angle to form a step 26 that is parallel to the narrow portion 27 of the band 10. A threaded connector 28 preferably in the shape of a cylinder is attached to step 26. An alternate preferred embodiment is illustrated in FIG. 1B and differs from the first preferred embodiment in that the widened portion 22 is bent at a right angle only once to form a vertical portion 24. Thus, this version of the band 10 lacks a step 26. In this preferred embodiment, the threaded connector 28 is attached to the side of the vertical portion 24 that faces away from the band 10.

In both preferred embodiments of the band 10, on the second end 30 there are a plurality of notches 32 protruding outwardly from the edge of the band 10. The notches 2 are preferably triangular in shape and extend in the same plane as the band 10. The notches 32 secure the band 10 into the adjustable slide 12. The adjustable slide 12 is L-shaped and is essentially an angled flange that includes a first portion 34 and second portion 36, which are perpendicular to each other. A hole 38 is located on the first portion 34 of the adjustable slide 12 and is configured to receive the threaded fastener 56 shown in FIG. 1A and FIG. 3.

At the intersection of the first and second portions 34 and 36 of the adjustable slide 12 is a slot 40 having a narrow portion 42 and a wide portion 44. The width of the narrow portion 42 of the slot 40 equals the width of the middle, narrow portion 27 of the band 10. The width of the wide portion 44 of the slot 40 equals the width of the middle, narrow portion 27 of the band 10 plus the extra width of the protruding notches 32 on the band's second end 30. Thus, the wide portion 44 of the slot 40 allows movement of the band's notched second end 30 through the slot 40. The narrow portion 42 permits the anchoring of the band's second end 30 in the area between the notches 32 by pushing the band 10 into the narrow portion 42. Once the band's second end 30 is anchored, the notches 32 prevent horizontal movement of the band 10 within the slide 12.

Figure 2:
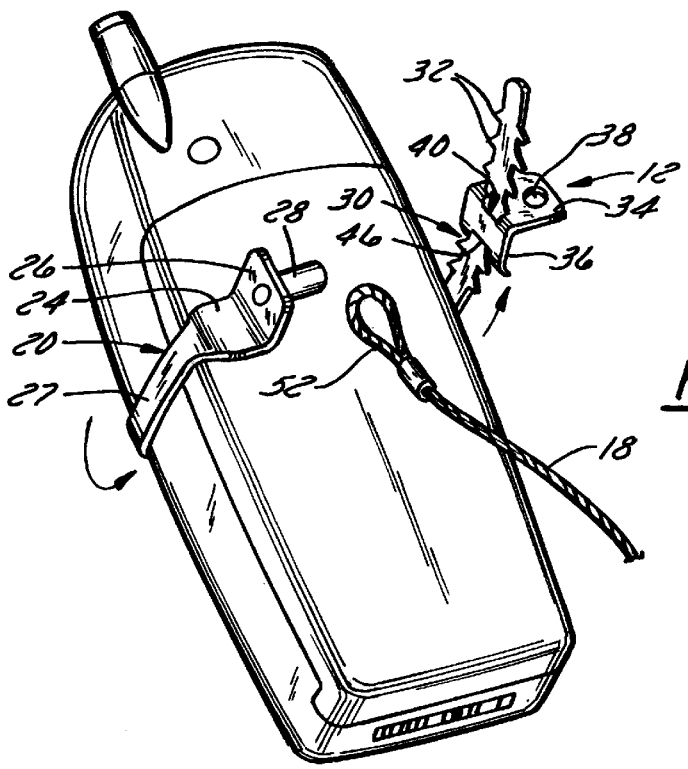
FIGS. 2 and 3 illustrate the steps for assembling the security band and fastening it to a cellular telephone.

In use, the band 10 is wrapped around the cellular phone with the first and second ends 20, 30 of the band 10 at the phone's backside as is shown in FIG. 2. The narrow portion 27 of the band 10 is at the phone's front side. The band's second end 30 is inserted through the wide portion 44 of slot 40 of the adjustable slide. The band 10 is pulled through the adjustable slide 12 until the hole 38 on the adjustable slide 12 is aligned with the threaded connector 28. The threaded connector 28 is then inserted through hole 38 and rotated with tool 16 and thereby treaded into the receiving end of threaded connector 28. In this position, the band 10 is securely wrapped around the cell phone. The free end of the band 10 beyond the adjustable slide 12 can be pressed into a groove 46 on the second portion 36 of the adjustable slide 12 that is formed between ears 48 and 50 (FIGS. 1A–1B). This further secures the band 10 in the adjustable slide 12. Because the adjustable slide 12 moves along the length of the band 10, the band 10 can properly fit around the varying types and sizes of cellular telephones.

Once the hole 38 of the adjustable slide 12 is aligned with the threaded connector 28 on the band 10, the two are separated and a looped end 52 of cable 18 is placed over the threaded connector 28. The end of the cable 18 that is opposite the looped end 52 is connected to the display (not shown) to tether the phone to the display.

Figure 3:
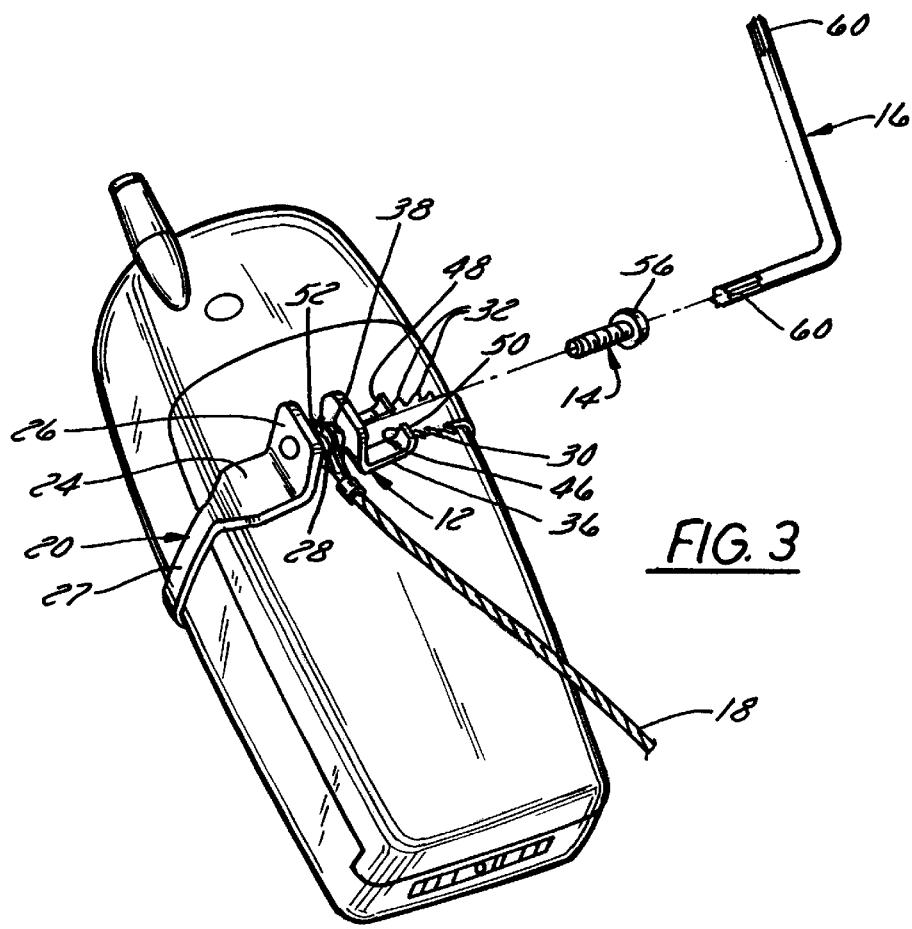

As FIG. 3 illustrates, the band 10 is fastened around the cell phone by inserting a security fastener 14 through hole 38 and the threaded connector 28. The security fastener 14 is a fastener, such as a security style bolt, that has a head 56 with a recess 58 therein. The recess 58 requires the use of a tool 16 other than a traditional flathead or Phillips head screwdriver in order to rotate the security fastener 14. For example, the head 56 of the security fastener 14 has a star-shaped recess 56 as is generally shown in FIGS. 1A–1B. The star-shaped recess 56 preferably includes a pin at its center. The pin extends upwardly to a height equal to the top of the security fastener 14. The star-shaped recess 56 can only be rotated with a tool 16 having an end 60 with a shape that is complementary to the star-shaped recess 56. Accordingly, a cellular phone may be securely displayed in a retail store.

It is understood that the various preferred embodiments are shown and described above to illustrate different possible features of the invention and the varying ways in which these features may be combined. Apart from combining the different features of the above embodiments in varying ways, other are also considered to be within the scope of the invention. Certain preferred modifications follow.

First, the band 10 can have any number of notches 32 including having notches 32 along the band's entire length. This permits the security band to be used with smaller cell phones. This feature is important as cell phones designers decrease the size of the phones.

Second, the cable 18 can be integral with the threaded connector 28, the adjustable slide 12, the first end 20 of the band 10, or any other part of the security band.

Third, the looped end 52 of the cable 18 can be formed in any way. For example and as illustrated in FIGS. 2–3, the looped end 52 can be formed by making a loop in the cable 18 and securing the loop with a fastener such as a small piece of metal that is clamped over the cable 18. Additionally, a tab or the like having a hole therein can be attached to the cable's end. The hole is then inserted over the threaded connector 28 to secure the cable 18 to the universal security band. Also, the loop can be made and secured after the end of the cable 18 is wrapped around the threaded connector 28.

The invention is not intended to be limited to the preferred embodiments described above, but rather is intended to be limited only by the claims set out below. Thus, the invention encompasses all alternate embodiments that fall literally or equivalently within the scope of these claims.

Finally, the present invention has been described and illustrated with reference to a particular preferred embodiment, which naturally includes many details about the various components that make up the invention. Of course, specific details of the preferred embodiment as described herein are not to be interpreted as limiting the scope of the invention, but are provided merely as a basis for the claims and for teaching one skilled in the art to variously practice and construct the present invention in any appropriate manner. Changes may be made in the details of the construction of various components without departing from the spirit of the invention, especially as defined in the following claims.

What is claimed is:

1. An adjustable display device for securing handheld cellular telephones of various sizes to a retail display stand, said display device comprising:
   (a) an elongated, bendable band, said band including a first end portion and a second end portion, said first end portion including a threaded connector, said second end portion including notches extending from edges of the band, the band being adapted for wrapping around a cell phone;
   (b) an adjustable slide member having a first portion and a second portion intersecting the first portion, said slide member including an opening and a slot, said opening disposed in the second portion and configured to receive a fastener, said slot located at the intersection of the first and second portions and configured to receive the second end portion of the band;
   (c) a fastener, received in the opening in the adjustable slide member, for fastening the adjustable slide member to the threaded connector on the first end portion of the band; and,
   (d) a cable for attaching the band to a display stand.

2. The adjustable display device of claim 1, wherein the first end portion of the band further comprises a vertical portion that is perpendicular to the band and a step that is parallel to the band, wherein the threaded connector is disposed on the step.

3. The adjustable display device of claim 1, wherein the first end portion of the band further comprises a vertical portion that is perpendicular to the band, wherein the threaded connector is disposed on the vertical portion and faces away from the band.

4. The adjustable display device of claim 1, wherein the slot comprises
   (a) a wide portion configured to receive the notches on the second end portion of the band; and,
   (b) a narrow portion configured to receive portions of the band between the notches.

5. The adjustable display device of claim 1, wherein the fastener comprises a security-type fastener having an unconventional recess, and the device further comprises a tool for tightening the fastener to the threaded connector, the tool having an end that is complementary to the recess in the security fastener.

6. The adjustable display device of claim 5, wherein the recess comprises a star-shaped recess.

7. The adjustable display device of claim 6, wherein the security fastener comprises a bolt.

8. The adjustable display device of claim 7, wherein the threaded connector comprises a threaded cylinder.

9. The adjustable display device of claim 7, wherein the cable further includes a looped end attached around the threaded connector.

10. A universal cell phone display device for securing handheld cell telephones of various sizes to a retail display area, said universal cell phone display device comprising:
    (a) a band configured to receive the cell phone, the band including a first end and a second end, said second end having notches extending from edges of the band;
    (b) an adjustable slide, said adjustable slide having a first portion and a second portion substantially perpendicular to the first portion, said adjustable slide further including a slot located at the intersection of the first and second portions, said slot including a wide portion configured to receive the notches on the second end of the band and a narrow portion configured to receive portions of the band between the notches;
    (c) a threaded connector disposed on the first end of the band;
    (d) a security fastener having a recess therein for engaging the second portion and fastening the adjustable slide to the threaded connector on the first end of the band;
    (e) a tool for tightening the security fastener, the tool having an end that is complementary to the recess in the security fastener; and
    (f) a cable for attaching the band to a display stand.

11. A method of securing a cell phone to a display comprising:
    (a) providing an elongated band, said band including a first end portion and a second end portion, said first end portion including a threaded connector, said second end portion including notches extending from edges of the band, the band being adapted for wrapping around a cell phone
    (b) wrapping the band around the cell phone;
    (c) providing an adjustable slide member having a first portion and a second portion intersecting the first portion, said slide member including an opening and a slot, said opening disposed in the second portion and configured to receive a fastener, said slot located at the intersection of the first and second portions and including a wide portion configured to receive the notches on the second end portion of the band and a narrow portion configured to receive portions of the band between the notches;
    (d) inserting the second end portion of the band through the wide portion of the slot on the adjustable slide;
    (e) manipulating the adjustable slide so that the narrow portion of the slot becomes engaged with at least one of the notches on the second end portion of the band;
    (f) providing a cable, and attaching one end of the cable to one of the band, the threaded connector, and the adjustable slide;
    (g) inserting a fastener into the opening disposed in the second portion and fastening the adjustable slide to the first end portion of the band; and,
    (h) attaching the opposite end of the cable to a display.

12. The method of claim 11, wherein the step of attaching the cable in step f comprises securing the cable to the threaded connector.

13. The method of claim 12, wherein the step of securing the cable comprises placing a looped end of the cable over the threaded connector.

14. The method of claim 11, wherein the step of fastening the adjustable slide to the first end portion of the band further comprises:
    (a) providing a security-type fastener having an unconventional recess;
    (b) providing a tool having an end that is complementary to the recess in the security fastener
    (c) tightening the fastener with the tool to the threaded connector on the first end portion of the band.

* * * * *